3,190,753
PROCESS FOR MODIFYING MILK FAT
Wilbur S. Claus, North Hollywood, and Edward M. Brooks, Arleta, Calif., assignors to Carnation Company, Los Angeles, Calif., a corporation of Delaware
Filed May 20, 1963, Ser. No. 281,675
4 Claims. (Cl. 99—54)

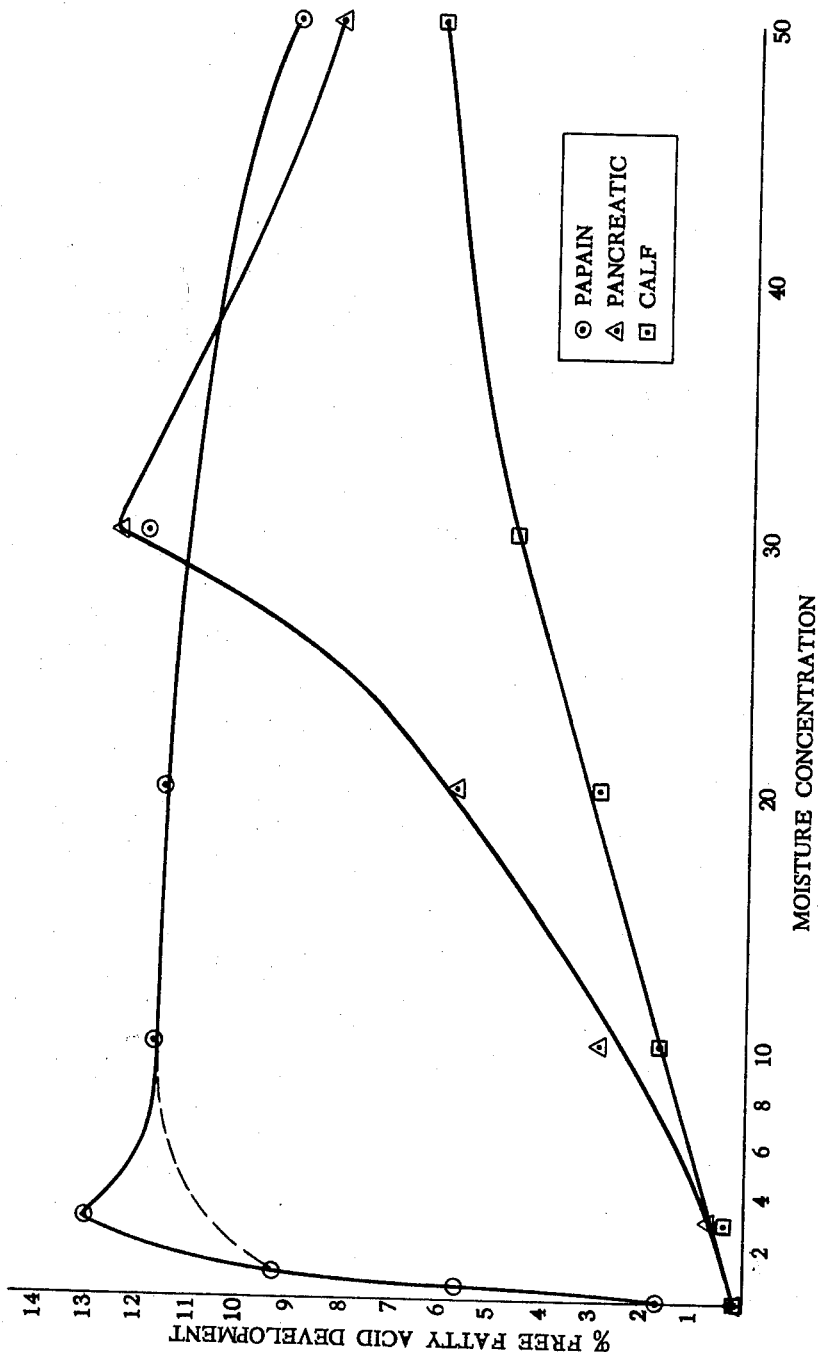

This invention relates to the lipolytic action of papain on fat, and particularly to a substantially anhydrous process utilizing the lipase enzyme, which produces flavorful free fatty acids in a butterfat.

The utilization of lipase in the manufacture of food products is very old and enzyme modified butterfats or other fat compositions have also been for many years articles of commerce useful in imparting certain very pronounced flavor characteristics of food compositions. It is known, for example, that the free fatty acid constituents in a product such as butterfat are extremely flavorful and that the short chain fatty acids have a more intense pungent flavor than the long chain fatty acids. It is also known that certain lipases will promote the formation of certain desirable short chain fatty acids so that the resulting product has specified and desirable flavor characteristics. The lipase reaction, on a butterfat for example, breaks the bond which holds the acid to the glycerol, thereby freeing these desirable fatty acids. The manufacture of products of this type are clearly described and disclosed in the patents to Farnham, Nos. 2,531,329 and 2,794,743. In these disclosures, the lipase composition utilized is obtainable from the edible head and neck tissue of milk fed mammals.

We have now found that an excellent lipase for the manufacture of enzyme modified fat products, and in particular a butterfat product, is contained in crude papain. The lipase enzyme of papain is water insoluble and in the clarification of crude papain, the lipase enzyme is included in a part of the insolubles which heretofore has been a waste material. We have further discovered that the lipase enzyme of papain is unique in that it will react with a fat under substantially anhydrous conditions to produce a substantially anhydrous final product.

In accordance with our discoveries, we provide the lipase enzyme of papain for the manufacture of enzyme modified fat. In particular, we provide a water insoluble papain enzyme obtainable from crude papain which will lipolize fat such as lipids of milk, and vegetable and animal fat under substantially anhydrous conditions to produce free fatty acids. Further, we furnish a process for producing modified fat products by lipolysis with papain. A preferred embodiment of our process involves treating fat, and particularly butterfat, with lipase enzyme of papain at a temperature above about 70° F., and preferably at 90° F. to 120° F. under substantially anhydrous conditions, to produce high concentrations of free fatty acids.

Papain is dried papain latex obtained from the Carica Papaya and is widely known to contain a proteolytic enzyme. The lipase enzyme of papain has the advantage of being water insoluble and is thus distinguishable from the proteolytic enzyme of papain.

The papain lipase enzyme possesses an outstanding advantage in that it reacts under substantially anhydrous conditions to produce a substantially anhydrous final product. In previous modified fat products, the product has had substantial moisture level resulting from the moisture necessary to support the reaction of the particular lipase with the fat. For example, 30.0 to 50.0% or more water is commonly used. It is possible to lipolyze anhydrous butterfat using the papain with as little as about 0.2% aqueous content. Generally, the removal of moisture from the final product is not easily accomplished because the flavor contributing soluble fatty acids are removed with the moisture. Therefore, the use of papain lipase in the substantially anhydrous process of the present invention is a significant advance in the art of producing high concentrations of flavorful free fatty acids from fats such as tallow, coconut, butterfat and anhydrous milk fat.

It is feasible to use crude papain in toto in a ground form to promote lipolysis. However, the Federal Food and Drug Administration does not currently permit most unclarified papain to be included in a food product. Water insoluble, clarified papain residue may be purchased commercially. Crude papain may be clarified by treating it with an aqueous solution to remove water soluble fractions and then treating the water insoluble fraction with hexane using standard solvent extraction methods. Lipase enzyme will be suspended in the hexane and water phase.

Anhydrous milk fat is the preferred fat for treatment with the papain lipase enzyme. Advantageously, fats such as coconut, cocoa butter, peanut, cotton seed, lard, tallow and lipids of milk such as butter oil, butter or plastic cream may also be used. It is desirable that the butterfat composition treated with the enzyme contain more than about 30% fat. Anhydrous milk fat, butter oil and butterfat, as used herein, are as defined in "Dairy Handbook," J. H. Frandsen, 1958.

To effect the process of this invention, the papain lipase is intimately admixed with the fat to be treated. The lipase is added to the fat in concentrations above about .5%. More desirably, the lipase concentration should range from about 1.0% to about 15.0% or more and preferably from about 1.0% to 7.0% depending upon the percent fatty acid conversion desired in a given reaction time.

Within the desirable range of papain lipase concentration, the moisture content in the reaction mixture may be virtually zero. However, it has been found that free fatty acid development is accelerated if from about 0.2% to about 4.0% moisture is present. It should be understood that it is possible to include substantial quantities of water in the reaction mixture, for example 20%; however, to produce a substantially anhydrous flavorful product it is highly desirable to maintain the moisture concentration below the suggested 4.0% level.

Using the papain lipase, it has been found that a significant decrease in the moisture concentration may occur during lipolysis. For example, when three samples of anhydrous milk fat were treated with 2% papain lipase for 1.0 hour at 100° F. using 2, 3 and 5% moisture concentrations and the reaction followed by inactivation at 200° F., the final products developed 9.4, 11.5 and 9.6% free fatty acid respectively and were found to contain 1.11, 1.28 and 1.14% moisture, respectively.

The holding time necessary to obtain a particular free fatty acid development is integrally related to the concentration of active ingredients. Obviously, the higher the concentration of enzyme, the shorter the reaction time. Utilizing the desirable enzyme concentration range, a time of from about 0.5 hour to about 24 hours is generally sufficient to produce 8% to 20% free fatty acid from substantially anhydrous fat.

Optimum temperatures for free fatty acid development are from about 90° F. to about 120° F. Below about 70° F., the enzyme is relatively inactive. Temperatures about the optimum range are feasible since in a substantially anhydrous system the enzyme is not significantly inactivated below about 180° F. to about 200° F. These higher temperatures may, however, have a deleterious effect upon the flavor of the modified fat product, particularly a modified butterfat product. The pH of the reaction is controlled by the reactants and no pH regulators need be added to the reaction mixture.

After the reaction has continued for a time sufficient to produce the desired level of free fatty acids, the reaction may be stopped by raising the reaction temperature to in excess of about 180° F. to inactivate the papain lipase. It has been noted that the papain lipase enzyme continues to possess at least partial lipolytic activity after being subject to temperatures of 180° F. to 200° F. in a substantially anhydrous system. Therefore, to further reduce the lipase activity after inactivating the enzyme at about 180° F. to 200° F., the modified fat should be chilled to room temperature or lower. If it is desired to reuse the enzyme, inactivation should be omitted and the enzyme separated from the modified fat by centrifugation or other conventional separation methods.

The modified fat obtained from the above process has a high concentration of free fatty acids. It has been found that a butterfat treated as described possesses a free fatty acid profile very similar to that of butter. In other words, the relationship of the flavor producing short chain free fatty acids to the intermediate and long chain free fatty acids is very similar to that of butter.

To illustrate the preparation of a modified fat, the following examples are given and the free fatty acid development reported in Tables I and II. In these examples, an anhydrous milk fat was heated to a temperature of 100° F. in Table I and 120° F. in Table II. The reaction mixture was continuously stirred and distilled water was introduced to the mixture. Thereafter the papain lipase was added to the fat in the prescribed quantity. Only stainless steel or glass lined equipment was permitted to contact the reaction mixture since certain metals promote oxidative rancidity. The mixture was held continuously at the prescribed temperature and the free fatty acid development was determined at intervals by withdrawing a sample and utilizing standard titration procedures.

*Table I*

| Percent Papain Lipase | Percent Added H₂O | Percent FFA Developed in Hours Holding Time | | | |
|---|---|---|---|---|---|
| | | 2 hrs. | 6 hrs. | 12 hrs. | 24 hrs. |
| 1.0 | 0.5 | 3.8 | 5.1 | 5.2 | 6.3 |
| 3.0 | 0.0 | 1.1 | 2.4 | 3.5 | 6.3 |
| 3.0 | 1.0 | 8.6 | 9.9 | 9.5 | 9.7 |
| 4.0 | 3.0 | 21.7 | | | |

*Table II*

| Percent Papain Lipase | Percent Added H₂O | Percent FFA Developed in Hours Holding Time | |
|---|---|---|---|
| | | 6 hrs. | 24 hrs. |
| 1.0 | 1.0 | 8.1 | 7.9 |
| 2.0 | 0.5 | 6.7 | 8.2 |
| 3.0 | 0.0 | 3.8 | 7.6 |

Butter and plastic cream were treated in substantially the same manner described above except that no moisture was added. In a period of two hours, at a temperature of 100° F. and an enzyme concentration of 2%, 7.62% free fatty acid was produced from the butter and 9.32% from the plastic cream.

To dramatically illustrate the effectiveness of the papain lipase in producing a substantially anhydrous modified butterfat, the activity of the papain lipase was compared with that of a calf lipase (as described in U.S. Patent No. 2,531,329) and a commercially obtainable pancreatic lipase. In this comparison, 12.0% calf lipase, 1.25% pancreatic lipase and 2.0% papain lipase was used. Each sample was held at 100° F. for 3 hours. The free fatty acid concentrations obtained at various moisture levels is reported below in Table III, and graphically reproduced in FIGURE 1.

*Table III*

| H₂O Level | Calf, Percent FFA | Pancreatic, Percent FFA | Papain, Percent FFA |
|---|---|---|---|
| 0 | 0.2 | 0.2 | 1.7 |
| 3 | 0.4 | 0.7 | 13.0 |
| 10 | 1.5 | 2.6 | 10.5 |
| 20 | 2.3 | 4.6 | 9.2 |
| 30 | 3.25 | 8.65 | 8.35 |
| 50 | 3.1 | 4.1 | 4.5 |

To further demonstrate the effectiveness of papain lipase, a variety of fats were treated under substantially anhydrous conditions using the procedure described for Tables I and II, except no water was added. In each example 3.0% crude papain was used. The results were as follows:

*Table IV*

| Fat | Initial Percent FAA | Percent FAA Development | Final Moisture In Product |
|---|---|---|---|
| Tallow | 3.48 | 8.3 in 6 hrs | 0.31 |
| Lard | 0.54 | 6.68 in 10 hrs | 0.61 |
| | | 13.8 in 30 hrs | 0.61 |
| Coconut | 0.21 | 5.53 in 13 hrs | <0.05 |
| | | 7.09 in 20 hrs | <0.05 |
| Cocoa Butter | 0.88 | 7.72 in 24 hrs | 0.25 |

To demonstrate a utility of the modified fat product, two commercial margarines were used. One margarine, identified as A, is a high priced spread costing approximately twice as much as B. To margarine B, the flavored modified anhydrous milkfat product of the present invention was added. The unmarked margarines were submitted to judges in taste tests.

*Table V*

Sample: Judges Preferring
Brand B without addition of modified fat _____ 2
Brand A _____ 3
Brand B+0.1% modified fat _____ 2
Brand B+0.2% modified fat _____ 5

The results of Table V clearly demonstrate that the addition of a very small percentage of the modified fat product of the present invention to a vegetable oil margarine imparts to the margarine a distinctive butter taste. The fat product of this invention is generally useful in foods to impart a butter, coconut or other flavors. In particular, it is advantageously used in margarines, powdered milk, instant milk products, chocolates, bakery products, such as biscuits, meat products, such as sausage, hamburger, etc. and in cookie fillings.

While the invention has been described with reference to particular preferred embodiments thereof, it should be understood that these are only illustrative and are not intended to limit the scope of the invention. Accordingly, variations and modifications will occur to those familiar with the art, and it is intended that such variations and modifications which fall within the broad scope and spirit of the appended claims be included.

Unless otherwise stated, all percentages are weight percent.

Having described our invention, what we claim is:

1. A process for the manufacture of a modified, substantially anhydrous fat composition which process comprises: treating a substantially anhydrous milk fat with above about 1.0% papain lipase at a temperature in the range of about 70° F. to about 180° F. in the presence of from about .2% to about 20% by weight water for a period sufficient to increase the free fatty acid content to from about 8% to about 20%.

2. The process of claim 1 wherein the fat subjected to treatment is a butter fat and the temperature is in the range of from about 70° F. to about 120° F.

3. A process for manufacturing a modified, substantially anhydrous fat composition which process comprises: treating a fat with from about 1.0% to about 15% papain lipase at a temperature in the range of about 90° F. to about 180° F. in the presence of from about .2% to about 4% by weight water for a period of from about .5 to about 24 hours to increase the free fatty acid content to about 8% to about 20%, and thereafter inactivating said papain lipase.

4. The process of claim 3 wherein the fat subjected to treatment is anhydrous milk fat and the temperature is in the range of about 90° F. to about 120° F.

References Cited by the Examiner

UNITED STATES PATENTS

| | | | |
|---|---|---|---|
| 2,233,179 | 2/41 | Otting et al. | 99—14 X |
| 2,531,329 | 11/50 | Farnham | 195—63 |
| 2,680,090 | 6/54 | Rose et al. | 195—30 |

OTHER REFERENCES

Journal of Biological Chemistry, vol. 64, 1925, p. 59.
Biochemical Journal, March 1938, pp. 462–466.
Chemical Abstracts, vol. 53, 1959, p. 15168a.

A. LOUIS MONACELL, *Primary Examiner.*